United States Patent [19]
Canaday et al.

[11] Patent Number: 6,064,387
[45] Date of Patent: May 16, 2000

[54] ANIMATED CURSOR AND ICON FOR COMPUTERS

[75] Inventors: April Canaday; Roy Stedman, both of Austin, Tex.

[73] Assignee: Dell, USA, L.P., Round Rock, Tex.

[21] Appl. No.: 09/012,260

[22] Filed: Jan. 23, 1998

[51] Int. Cl.[7] .................................................. G06F 15/00
[52] U.S. Cl. ......................... 345/357; 345/349; 345/145; 345/159; 345/160; 345/163
[58] Field of Search ..................... 345/339, 348, 345/349, 350, 351, 145, 146, 977, 966, 967, 357, 159, 160, 163

[56] References Cited

U.S. PATENT DOCUMENTS

| | | | |
|---|---|---|---|
| 5,220,657 | 6/1993 | Bly et al. ................................. | 345/329 |
| 5,321,838 | 6/1994 | Hensley et al. ..................... | 345/977 X |
| 5,646,647 | 7/1997 | Chow ....................................... | 345/145 |
| 5,734,805 | 3/1998 | Isensee et al. .......................... | 345/339 |
| 5,745,715 | 4/1998 | Pickover et al. ........................ | 345/348 |
| 5,844,560 | 12/1998 | Crutcher et al. ..................... | 345/977 X |
| 5,877,764 | 3/1999 | FFeitelson et al. ................. | 345/977 X |
| 5,880,729 | 3/1999 | Johnston, Jr. et al. ............. | 345/977 X |

FOREIGN PATENT DOCUMENTS

WO 88/00750  1/1988  WIPO .
WO 94/24657  10/1994  WIPO .

*Primary Examiner*—Ba Huynh
*Attorney, Agent, or Firm*—Haynes & Boone, L.L.P.

[57] ABSTRACT

In general, a plurality of embodiments include an animated "target" icon and/or cursor for guiding a user to take a desired action. In particular, the user is guided to click on the target icon, thereby to initiate the completion of the installation of factory installed software. In one embodiment, the target icon resembles a locked padlock and the mouse cursor resembles a key, thus implying a connection therebetween. When the user places the key-shaped mouse cursor over the padlock-shaped target icon and clicks on the target icon, the appearance of the padlock-shaped icon changes to reflect its now "unlocked" state and completion of the factory-installed software installation process is initiated.

57 Claims, 5 Drawing Sheets

ANIMATED CURSOR AND ICON FOR COMPUTERS

TECHNICAL FIELD

One embodiment relates generally graphical user interfaces ("GUIs") and, more particularly, to a technique for compelling a computer user to take a desired action.

BACKGROUND

Typically, when a user turns on or reboots a computer, one or more factory installed software applications are initialized and automatically begin executing. As a result, the applications pop up windows, toolbars, and/or dialog boxes for use in connection therewith.

Software specifications issued by Microsoft Corporation of Redmond, Wash., in connection with its Windows operating systems require that, when the user first turns on the computer, a "Welcome to Windows" dialog box is the first and only item displayed to the user. Not until the user closes the "Welcome" dialog box are the above-noted windows, toolbars, and dialog boxes permitted to be displayed. As a result, computer manufacturers typically cannot complete the factory installation of software; therefore, the process must be completed by the user after he or she closes the "Welcome to Windows" dialog box. Unfortunately, users, who are usually not aware of the restrictions imposed by Microsoft, must be instructed to take steps to initiate the completion of this process.

Therefore, what is needed is a strategy that guides users to complete the configuration of factory installed software.

SUMMARY

In general, a plurality of embodiments include a technique for compelling a user to take a desired action. In several embodiments, the user is guided to click on a target icon, thereby to initiate the completion of the installation of factory installed software. In one embodiment, the target icon resembles a locked padlock and a mouse cursor resembles a key, thus implying a connection therebetween. When the user places the key-shaped mouse cursor over the padlock-shaped target icon and clicks on the target icon, the appearance of the padlock-shaped icon changes to reflect its now "unlocked" state and completion of the factory-installed software installation process is initiated.

In a second embodiment, when the mouse is idle, the mouse cursor is slowly automatically "drawn" toward the target icon. When the user clicks on the icon, completion of the factory-installed software installation process is initiated.

In a third embodiment, the target icon flashes at one rate and the mouse cursor flashes at a different rate, such that the icon and cursor are flashing out of sync with one another. As the user moves the mouse cursor closer to the icon, the flashing becomes more synchronized, such that when the cursor is positioned over the icon, the cursor and icon are completely in sync. When the user clicks on the icon, completion of the factory-installed software installation process is initiated.

In a fourth embodiment, the target icon follows or tracks the mouse cursor around the screen, so that the user has no choice but to follow the forced path of clicking on the icon, which initiates the completion of the factory-installed software installation process.

In a fifth embodiment, the underlying functions of all desktop icons are usurped, such that the user's clicking on any icon will initiate the completion of the factory-installed software installation process.

In a sixth embodiment, the color of the target icon and/or the mouse cursor is gradually changed from blue, representing "cold" or "far," to red, representing "hot" or "close," as the user moves the mouse cursor toward the target icon. When the user clicks on the icon, completion of the factory-installed software installation process is initiated.

In a seventh embodiment, auditory clues, e.g, "closer" or "farther" are used to indicate the cursor's distance from the target icon. The user's clicking on the target icon initiates the completion of the factory-installed software installation process.

A technical advantage achieved is that no visible or audible automatically started applications are used prior to the appearance of the Microsoft "Welcome to Windows" dialog box.

A further technical advantage achieved is that users are subtly compelled to take action to compete the installation of factory-installed software.

DESCRIPTION OF THE PREFERRED EMBODIMENTS

Figure 1:
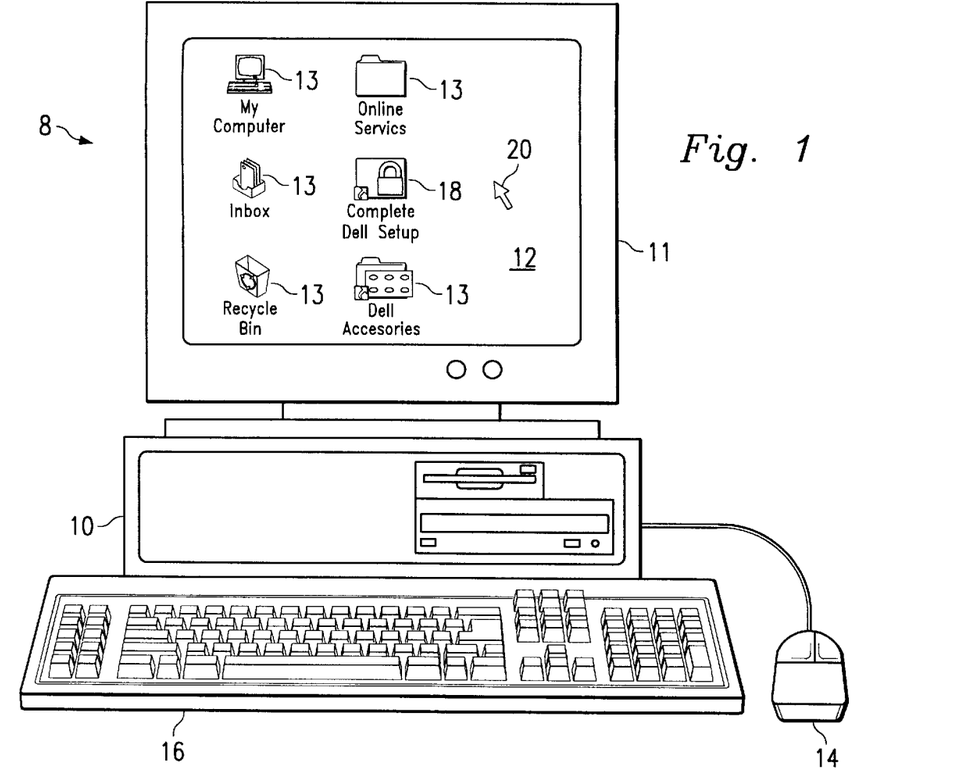
FIG. 1 is a system block diagram of a personal computer embodying features of one or more embodiments.

FIG. 1 illustrates a computer system for implementing one or more of the preferred embodiments. As shown in FIG. 1, the computer system 8 includes a chassis 10, a monitor 11 having a display area 12 with a one or more desktop icons 13 displayed thereon, and various I/O devices, such as a mouse 14 and a keyboard 16 and storage devices (not shown) connected to and/or integrated into the chassis 10. It will be recognized that, although not explicitly shown in FIG. 1, the computer system 8 includes various other devices and subsystems, such as a central processing unit ("CPU") and other processors, installed in the chassis 10 that are known to those of ordinary skill in the art and therefore not further described herein. It will be further recognized that software instructions for implementing the features described herein are stored within the computer 8 in appropriate storage devices for access and execution by the CPU and other processors as necessary.

Each of the embodiments described in greater detail below involve a target icon 18 and a mouse cursor 20. Selection of the target icon 18, which is typically accomplished by using the mouse 14 to position the mouse cursor 20 over the icon 18 and then depressing a mouse button, initiates the completion of the factory-installed software installation process. As used herein, the phrases "clicking on an icon" and "selecting an icon" are used interchangeably.

Figure 2A:
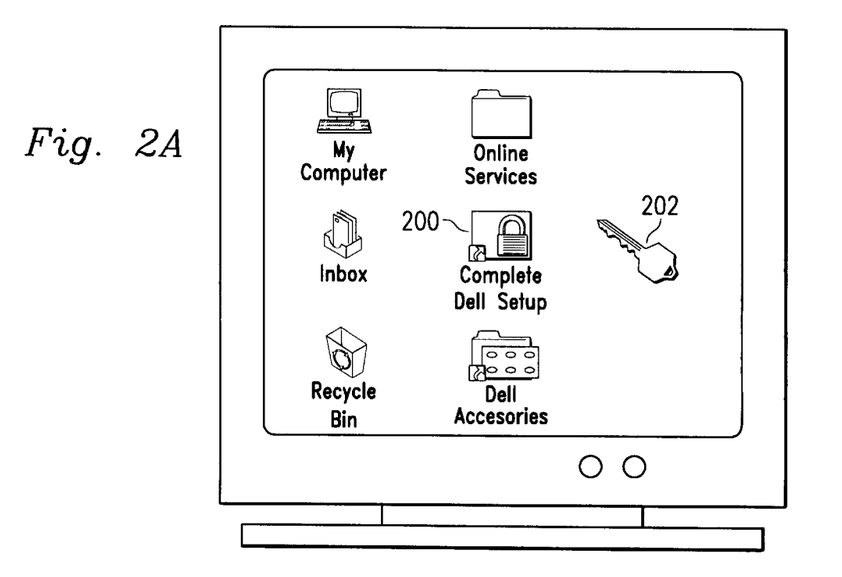
FIGS. 2A and 2B illustrate a first embodiment.
Figure 2B:
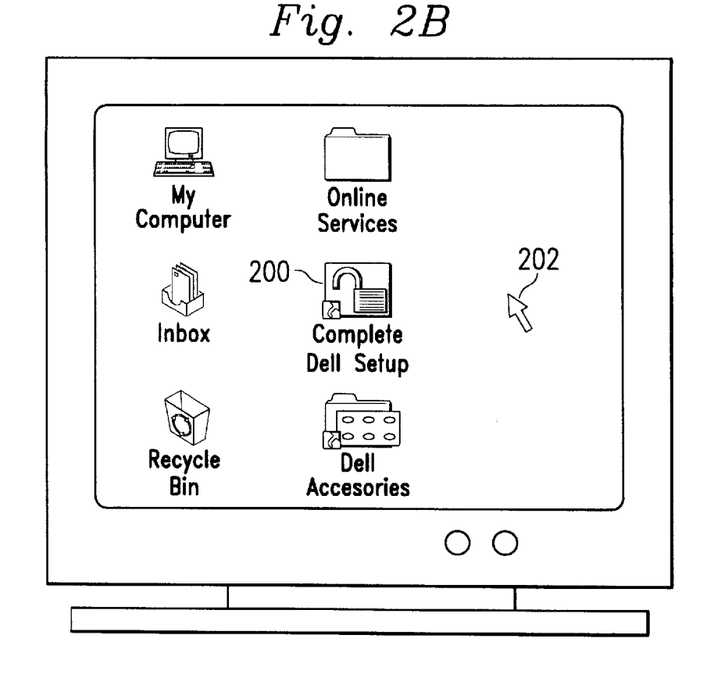
Figure 2C:
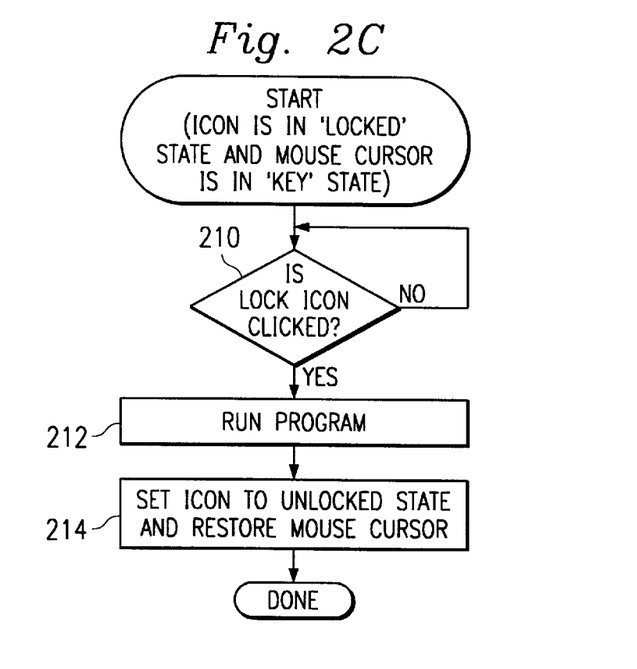
FIG. 2C is a flowchart of the operation of the first embodiment.

FIG. 2A illustrates a first embodiment in which the target icon 200 initially resembles a locked padlock and the mouse cursor 202 resembles a key, thus implying to a user a connection between the icon and the mouse cursor. As shown in FIG. 2C, subsequent to display of the target icon 200 and mouse cursor 202, in step 210, a determination is made whether the user has clicked on the target icon 200. If not, execution remains at step 210 until the user clicks on the target icon 200, at which point execution proceeds to step 212, in which the factory-installed software installation process is initiated and completed. Finally, in step 214, the target icon 200 is deactivated and set to an unlocked state in which it resembles an open padlock and the mouse cursor is restored to its normal appearance, as shown in FIG. 2B.

Figure 3:
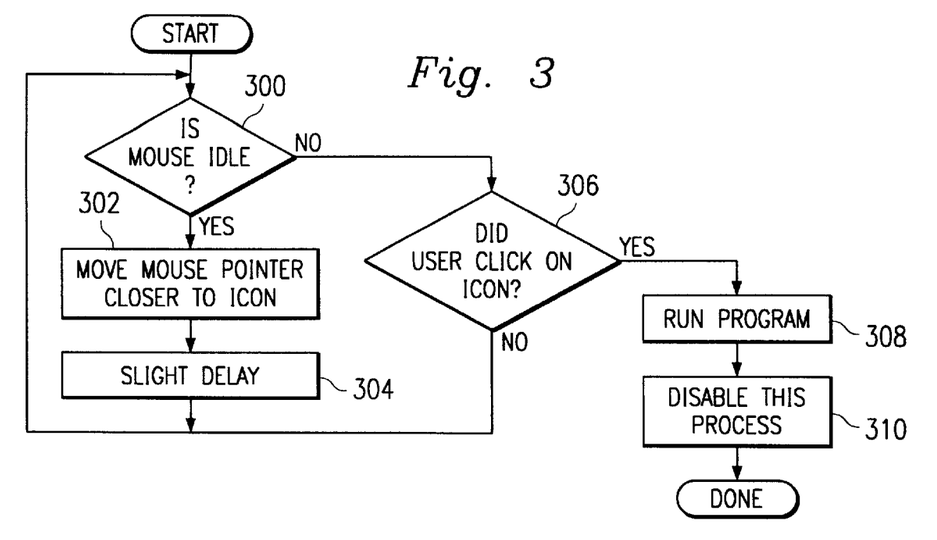
FIG. 3 is a flowchart of the operation of a second embodiment.

FIG. 3 is a flowchart of the operation of a second embodiment. In this embodiment, the target icon 18 and mouse cursor 20 may have any appearance. In step 300, a determination is made whether the mouse 14 is idle. If so, execution proceeds to step 302 in which the mouse cursor 20 is moved closer to the target icon 20. After a slight delay 304, execution returns to step 300.

If in step 300 it is determined that the mouse 14 is not idle, execution proceeds to step 306, in which a determination is made whether the user has clicked on the target icon 18. If the user has not clicked on the target icon 18, execution returns to step 300; otherwise, execution proceeds to step 308, in which the factory-installed software installation process is initiated and completed. Finally, in step 310, the target icon 18 is deactivated or removed.

Figure 4:
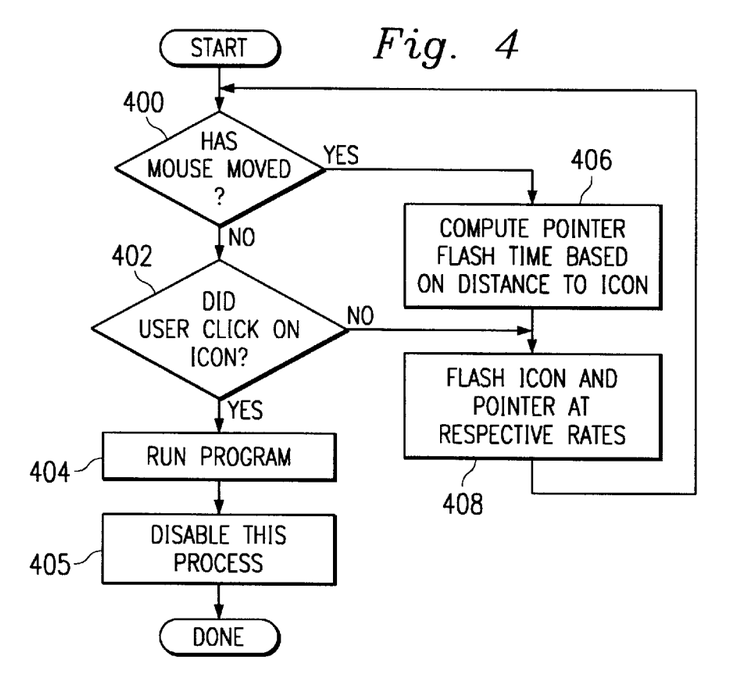
FIG. 4 is a flowchart of the operation of a third embodiment.

FIG. 4 is a flowchart of the operation of a third embodiment. In this embodiment, in step 400, a determination is made whether the mouse 14 has moved. If not, execution proceeds to step 402, in which a determination is made whether the user has clicked on the target icon 18. If the user has clicked on the target icon 18, execution proceeds to step 404, in which the factory-installed software installation process is initiated and completed, and then to step 405, in which the target icon 18 is deactivated or removed. If in step 400 a determination is made that the mouse 14 has not moved, execution proceeds to step 406, in which the flash rate of the mouse cursor 20 is adjusted based on the distance between the cursor 20 and the target icon 18. For example, if the distance between the cursor 20 and target icon 18 has increased as a result of the mouse 14 movement, the flash rate of the mouse cursor 20 will increase, indicating a greater urgency. On the other hand, if the distance between the cursor 20 and icon 18 has decreased as a result of the mouse 14 movement, the flash rate of the mouse cursor 20 will decrease, indicating that success is close at hand. Upon completion of step 406, execution proceeds to step 408. In step 408, the target icon 18 and cursor 20 are flashed at their respective rates and execution returns to step 400. If in step 402 a determination is made that the user did not click on the target icon 18, execution proceeds directly to step 408.

Figure 5:
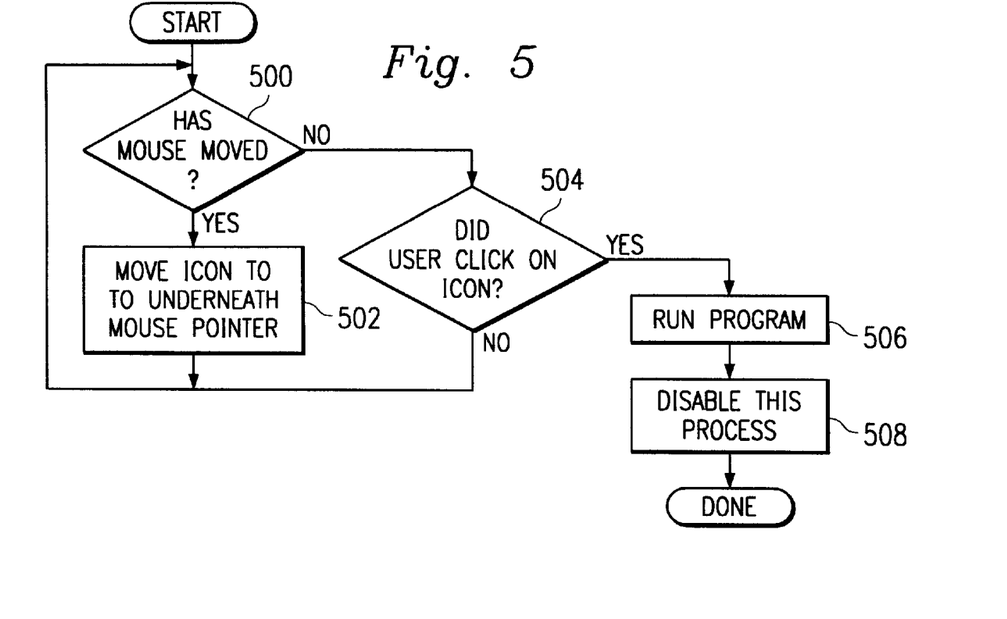
FIG. 5 is a flowchart of the operation of a fourth embodiment.

FIG. 5 is a flowchart of the operation of a fourth embodiment. In step 500, a determination is made whether the mouse 14 has moved. If so, execution proceeds to step 502, in which the target icon 18 is moved to underlie the mouse cursor 20 and execution returns to step 500. If in step 500 it is determined that the mouse 14 has not moved, execution proceeds to step 504, in which a determination is made whether the user has clicked on the target icon 18. If not, execution returns to step 500; otherwise, execution proceeds to step 506, in which the factory-installed software installation process is initiated and completed, and then to step 508, in which the target icon 18 is either deactivated or removed. In this fifth embodiment, therefore, the target icon 18 follows or "tracks" the movement of the mouse cursor 20 such that the user will have no choice but to eventually click on the target icon.

Figure 6:
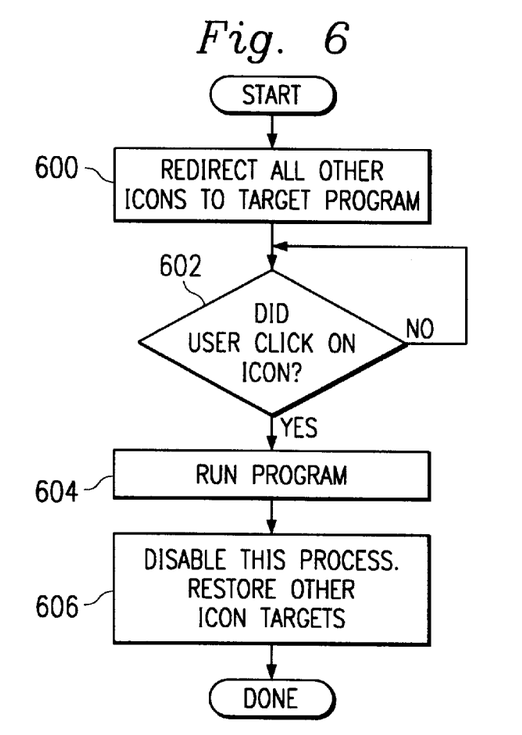
FIG. 6 is a flowchart of the operation of a fifth embodiment.

FIG. 6 is a flowchart of the operation of a fifth embodiment. In step 600, all desktop icons 13 are redirected such that selection of any icon results in the initiation and completion of the factory-installed software installation process rather than in the execution of the corresponding application. In step 602, a determination is made whether the user has clicked on an icon. If not, execution remains at step 602; otherwise, execution proceeds to step 604. In step 604, the factory-installed software installation process is initiated and completed. In step 606, the respective functions of all desktop icons 13 are restored such that selection of any icon results in the execution of the corresponding application. In addition, the target icon 18 is either deactivated or removed.

Figure 7:
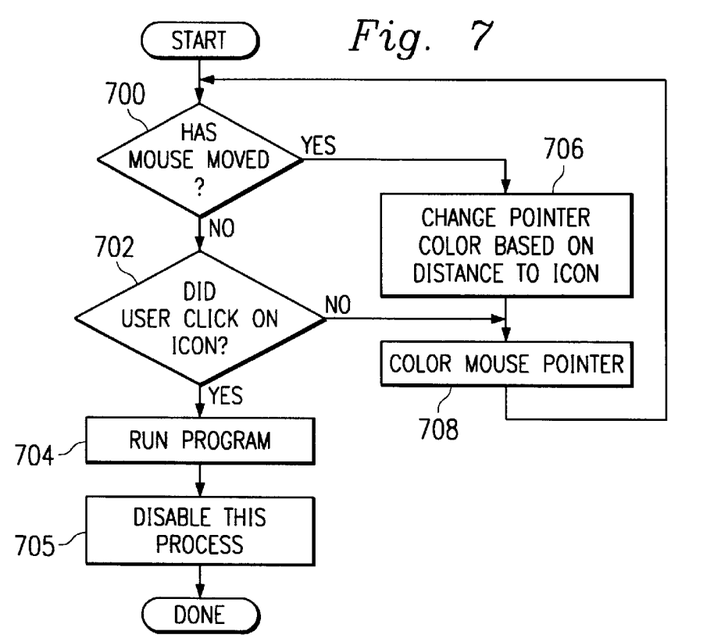
FIG. 7 is a flowchart of the operation of a sixth embodiment.

FIG. 7 is a flowchart illustrating the operation of a sixth embodiment. In step 700, a determination is made whether the mouse 14 has moved. If not, execution proceeds to step 702, in which a determination is made whether the user has clicked on the target icon 18. If it is determined that the user has clicked on the target icon 18, execution proceeds to step 704, in which the factory-installed software installation process is initiated and completed, and then to step 705, in which the target icon 18 is either deactivated or removed.

If in step 700 it is determined that the mouse 14 has not moved, execution proceeds to step 706, in which the color of the mouse cursor 20 is adjusted based on the distance between the cursor 20 and the target icon 18. For example, the greater the distance between the cursor 20 and icon 18, the "bluer" (i.e., "colder") the cursor, while the smaller the distance between the cursor 20 and icon 18, the "redder" (i.e., "hotter") the cursor. Upon completion of step 706, execution proceeds to step 708. Similarly, if in step 702 it is determined that the user did not click on the target icon 18, execution proceeds directly to step 708. In step 708, the color of mouse cursor 20 is adjusted and execution returns to step 700.

Figure 8:
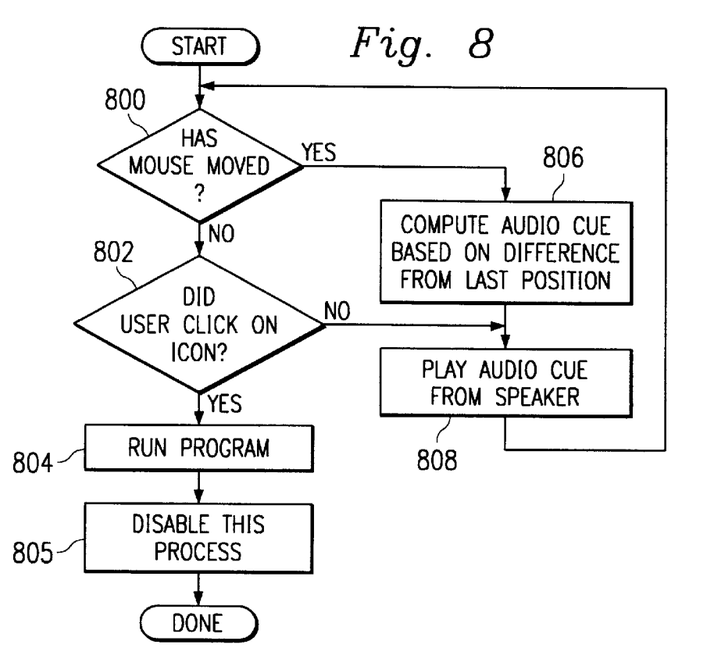
FIG. 8 is a flowchart of the operation of a seventh embodiment.

FIG. 8 is a flowchart of a seventh embodiment. In step 800, a determination is made whether the mouse 14 has moved. If not, execution proceeds to step 802, in which a determination is made whether the user clicked on the target icon 18. If it is determined that the user clicked on the target icon 18, execution proceeds to step 804, in which the factory-installed software installation process is initiated and completed, and then to step 805, in which the target icon 18 is either deactivated or removed. If in step 800 it is determined that the mouse 14 has moved, execution proceeds to step 806, in which an audio cue is selected based on the difference in the distance between the cursor 20 and icon 18 prior to and after the movement of the mouse 14. For example, if as a result of the mouse 14 movement the distance is smaller, the audio cue might be "closer", while if the distance is greater, the audio cue might be "farther." In step 808, the selected audio cue is played to the user. Alternatively, if in step 802, the user did not click on the target icon 18, execution proceeds to step 808.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method of inducing a user to initiate a process to complete an installation of factory-installed software on a computer, the method comprising:

displaying on a display a mouse cursor;

displaying on said display a target icon for configuring factory-installed software;

graphically indicating a need to direct the mouse cursor to click on the icon of the factory-installed software to initiate the configuration;

responsive to said user's clicking on said target icon:
initiating said configuration of factory-installed software; and
deactivating said target icon upon completion of the configuration.

2. The method of claim 1 wherein said deactivating comprises removing said target icon from said display.

3. The method of claim 1 further comprising, subsequent to said completing, changing said appearance of said target icon to an unlocked padlock shape.

4. The method of claim 1 further comprising, subsequent to said completing, changing said appearance of said mouse cursor to an arrow shape.

5. The method of claim 1 further comprising, subsequent to said initiating, returning said appearance of said mouse cursor to normal.

6. The method of claim 1 further comprising, until said user clicks on said target icon, automatically moving said mouse cursor toward said target icon while said mouse is idle.

7. The method of claim 6 further comprising performing said moving until said mouse cursor rests on said target icon.

8. The method of claim 6 further comprising performing said moving until said user clicks on said target icon.

9. The method of claim 1 wherein, as said user moves said mouse cursor around on said display, said target icon tracks said mouse cursor until said user clicks on said target icon.

10. The method of claim 9 wherein, as said user moves said mouse cursor around on said display, said target icon is displayed as underlying said mouse cursor until said user clicks on said target icon.

11. The method of claim 1 further comprising:

deactivating all icons displayed on said display other than said target icon until said user clicks on said target icon; and responsive to said user clicking on said target icon, reactivating all of said icons other than said target icon.

12. A method of inducing a user to take an action to initiate a computer-implemented process, the method comprising:

displaying on a display a mouse cursor by flashing said mouse cursor on and off at a first rate of speed;

displaying on said display a target icon by flashing said target icon on and off at a second rate of speed wherein as said user moves said mouse cursor away from said target icon, a difference between said first and second flash rates is increased and wherein as said user moves said mouse cursor toward said target icon, said difference between said first and second flash rates is decreased;

responsive to said user's clicking on said target icon:
initiating said computer-implemented process; and
deactivating said target icon.

13. The method of claim 12 wherein said first and second flash rates are identical when said mouse cursor is placed over said target icon such that said target icon and mouse cursor are flashing in sync with one another.

14. A method of inducing a user to take an action to initiate a computer-implemented process, the method comprising:

displaying on a display a mouse cursor;

displaying on said display a target icon;

gradually changing a color of said mouse cursor from a first color to a second contrasting color as said mouse cursor is moved toward said target icon;

gradually changing said color of said mouse cursor from said second color back to said first color as said mouse cursor is moved away from said icon;

responsive to said user's clicking on said target icon:
initiating said computer implemented process; and
deactivating said target icon.
wherein an appearance of said mouse cursor is initially a key shape and an appearance of said target icon is initially a locked padlock shape to provide the user an indication of the need to direct the mouse cursor to click on the icon.

15. The method of claim 14 wherein said first color of said mouse cursor is blue, and wherein said second color of said mouse cursor is red.

16. A method of inducing a user to take an action to initiate a computer-implemented process, the method comprising:

displaying on a display a mouse cursor;

displaying on said display a target icon;

gradually changing a color of said target icon from a first color to a second contrasting color as said mouse cursor is moved toward said target icon;

gradually changing said color of said target icon from said second color back to said first color as said mouse cursor is moved away from said icon;

responsive to said user's clicking on said target icon:
initiating said computer implemented process; and
deactivating said target icon,
wherein an appearance of said mouse cursor is initially a key shape and an appearance of said target icon is initially a locked padlock shape to provide the user an indication of the need to direct the mouse cursor to click on the icon.

17. The method of claim 16 wherein said first, color of said target icon is blue, and wherein said second color of said mouse cursor is red.

18. A method of inducing a user to take an action to initiate a computer-implemented process, the method comprising:

displaying on a display a mouse cursor;

displaying on said display a target icon;

responsive to each movement of said mouse cursor, providing an auditory clue to said user, said auditory clue comprising an audible word indicating whether the mouse cursor has been moved closer to or further from the target icon to indicate a distance of said mouse cursor from said target icon, responsive to said user's clicking on said target icon:
initiating said computer implemented process; and
deactivating said target icon.
wherein an appearance of said mouse cursor is initially a key shape and an appearance of said target icon is initially a locked padlock shape to provide the user an indication of the need to direct the mouse cursor to click on the icon.

19. The method of claim 18 wherein said auditory clues indicate whether said user is moving the mouse cursor closer to or farther from said target icon.

20. In a computer comprising a display, a central processing unit ("CPU"), and one or more input/output ("I/O") devices, a method of inducing a user to initiate a process to complete an installation of factory-installed software on said computer, the method comprising:

displaying on a display a mouse cursor;

displaying on said display a target icon for configuring factory-installed software;

graphically indicating the need to direct the mouse cursor to click on the icon of the factory-installed software to initiate the configuration;

responsive to said user's clicking on said target icon;
initiating said configuration of said factory-installed software; and
deactivating said target icon upon completion of the configuration,
wherein an appearance of said mouse cursor is initially a key shape and an appearance of said target icon is initially a locked padlock shape to provide the user an indication of the need to direct the mouse cursor to click on the icon of the factory-installed software.

21. The method of claim 20 wherein said deactivating comprises removing said target icon from said display.

22. The method of claim 20 further comprising, subsequent to said completing, changing said appearance of said target icon to an unlocked padlock shape.

23. The method of claim 20 further comprising, subsequent to said completing, changing said appearance of said mouse cursor to an arrow shape.

24. The method of claim 20 further comprising, subsequent to said initiating, returning said appearance of said mouse cursor to normal.

25. The method of claim 20 further comprising, until said user clicks on said target icon, automatically moving said mouse cursor toward said target icon while said mouse is idle.

26. The method of claim 25 further comprising performing said moving until said mouse cursor rests on said target icon.

27. The method of claim 25 further comprising performing said moving until said user clicks on said target icon.

28. The method of claim 20 wherein, as said user moves said mouse cursor around on said display, said target icon tracks said mouse cursor until said user clicks on said target icon.

29. The method of claim 20 wherein, as said user moves said mouse cursor around on said display, said target icon is displayed as underlying said mouse cursor until said user clicks on said target icon.

30. The method of claim 20 further comprising:
deactivating all icons displayed on said display other than said target icon until said user clicks on said target icon; and
responsive to said user clicking on said target icon, reactivating all of said icons other than said target icon.

31. In a computer comprising a display, a central processing unit ("CPU"), and one or more input/output ("I/O") devices, a method of inducing a user to initiate a process on said computer, the method comprising:

displaying on a display a mouse cursor by flashing said mouse cursor on and off at a first rate of speed;

displaying on said display a target icon by flashing said target icon on and off at a second rate of speed wherein as said user moves said mouse cursor away from said target icon, a difference between said first and second flash rates is increased and wherein as said user moves said mouse cursor toward said target icon, said difference between said first and second flash rates is decreased;

responsive to said user's clicking on said target icon:
initiating said process; and
deactivating said target icon.

32. The method of claim 31 wherein said first and second flash rates are identical when said mouse cursor is placed over said target icon such that said target icon and mouse cursor are flashing in sync with one another.

33. In a computer comprising a display, a central processing unit ("CPU"), and one or more input/output ("I/O") devices, a method of inducing a user to initiate a process on a computer, the method comprising:

displaying on a display a mouse cursor;

displaying on said display a target icon;

gradually changing a color of said mouse cursor from a first color to a second contrasting color as said mouse cursor is moved toward said target icon;

gradually changing said color of said mouse cursor from said second color back to said first color as said mouse cursor is moved away from said icon;

responsive to said user's clicking on said target icon:
completing said process; and
deactivating said target icon,
wherein an appearance of said mouse cursor is initially a key shape and an appearance of said target icon is initially a locked padlock shape to provide the user an indication of the need to direct the mouse cursor to click on the icon.

34. The method of claim 33 wherein said first color of said mouse cursor is blue, and wherein said second color of said mouse cursor is red.

35. In a computer comprising a display, a central processing unit ("CPU"), and one or more input/output ("I/O") devices, a method of inducing a user to initiate a process on a computer, the method comprising:

displaying on a display a mouse cursor;

displaying on said display a target icon;

gradually changing a color of said target icon from a first color to a second contrasting color as said mouse cursor is moved toward said target icon;

gradually changing said color of said target icon from said second color back to said first color as said mouse cursor is moved away from said icon;

responsive to said user's clicking on said target icon:
completing said process; and
deactivating said target icon;
wherein an appearance of said mouse cursor is initially a key shape and an appearance of said target icon is initially a locked padlock shape to provide the user an indication of the need to direct the mouse cursor to click on the icon.

36. The method of claim 35 wherein said first color of said target icon is blue, and wherein said second color of said mouse cursor is red.

37. In a computer comprising a display, a central processing unit ("CPU"), and one or more input/output ("I/O") devices, a method of inducing a user to initiate a process on a computer, the method comprising:

displaying on a display a mouse cursor;

displaying on said display a target icon;

responsive to each movement of said mouse cursor, providing an auditory clue to said user, said auditory clue comprising an audible word indicating whether the mouse cursor has been moved closer to or further from the target icon;

responsive to said user's clicking on said target icon; completing said process; and deactivating said target icon, wherein an appearance of said mouse cursor is initially a key shape and an appearance of said target icon is initially a locked padlock shape to provide the user an indication of the need to direct the mouse cursor to click on the icon.

38. The method of claim 27 wherein said auditory clues indicate whether said user is moving the mouse cursor closer to or farther from said target icon.

39. In a computer comprising a display, a central processing unit ("CPU"), and one or more input/output ("I/O") devices, a system for inducing a user to initiate a process to complete an installation of factory-installed software on said computer, the system comprising:

means for displaying on said display a mouse cursor;

means for displaying on said display a target icon for configuring factory-installed software;

means for graphically indicating the need to direct the mouse cursor to click on the icon of the factory-installed software to initiate the configuration;

means responsive to said user's clicking on said target icon for initiating said configuration of said factory-installed software and deactivating said target icon upon completion of the configuration, wherein an appearance of said mouse cursor is initially a key shape and an appearance of said target icon is initially a locked padlock shape to provide the user an indication of the need to direct the mouse cursor to click on the icon of the factory-installed software.

40. The system of claim 39 wherein said means for deactivating comprises means for removing said target icon from said display.

41. The system of claim 39 further comprising means for changing said appearance of said target icon to an unlocked padlock shape subsequent to said completing.

42. The system of claim 39 further comprising means for changing said appearance of said mouse cursor to an arrow shape subsequent to said completing.

43. The system of claim 39 further comprising means for returning said appearance of said mouse cursor to normal subsequent to said initiating.

44. The system of claim 39 further comprising means for automatically moving said mouse cursor toward said target icon while said mouse is idle until said user clicks on said target icon.

45. The system of claim 44 wherein said moving is performed until said mouse cursor rests on said target icon.

46. The system of claim 44 wherein said moving is performed until said user clicks on said target icon.

47. The system of claim 39 wherein, as said user moves said mouse cursor around on said display, said target icon tracks said mouse cursor until said user clicks on said target icon.

48. The system of claim 38 wherein, as said user moves said mouse cursor around on said display, said target icon is displayed as underlying said mouse cursor until said user clicks on said target icon.

49. The system of claim 38 further comprising:

means for deactivating all icons displayed on said display other than said target icon until said user clicks on said target icon; and means responsive to said user clicking on said target icon for reactivating all of said icons other than said target icon.

50. In a computer comprising a display, a central processing unit ("CPU"), and one or more input/output ("I/O") devices, a system for inducing a user to initiate a process on said computer, the system comprising:

means for displaying on said display a mouse cursor by flashing said mouse cursor on and off at a first rate of speed;

means for displaying on said display a target icon by flashing said target icon on and off at a second rate of speed wherein as said user moves said mouse cursor away from said target icon, a difference between said first and second flash rates is increased and wherein as said user moves said mouse cursor toward said target icon, said difference between said first and second flash rates is decreased; and means responsive to said user's clicking on said target icon for completing said process and deactivating said target icon.

51. The system of claim 50 wherein said first and second flash rates are identical when said mouse cursor is placed over said target icon such that said target icon and mouse cursor are flashing in sync with one another.

52. In a computer comprising a display, a central processing unit ("CPU"), and one or more input/output ("I/O") devices, a system of inducing a user to initiate a process on a computer, the system comprising:

means for displaying on a display a mouse cursor;

means for displaying on said display a target icon;

means for gradually changing a color of said mouse cursor from a first color to a second contrasting color as said mouse cursor is moved toward said target icon;

means for gradually changing said color of said mouse cursor from said second color back to said first color as said mouse cursor is moved away from said icon; and means responsive to said user's clicking on said target icon for completing said process and deactivating said target icon, wherein an appearance of said mouse cursor is initially a key shape and an appearance of said target icon is initially a locked padlock shape to provide the user an indication of the need to direct the mouse cursor to click on the icon.

53. The system of claim 52 wherein said first color of said mouse cursor is blue, and wherein said second color of said mouse cursor is red.

54. In a computer comprising a display, a central processing unit ("CPU"), and one or more input/output ("I/O") devices, a system of inducing a user to initiate a process on a computer, the system comprising:

means for displaying on a display a mouse cursor;

means for displaying on said display a target icon;

means for gradually changing a color of said target icon from a first color to a second contrasting color as said mouse cursor is moved toward said target icon;

means for gradually changing said color of said target icon from said second color back to said first color as said mouse cursor is moved away from said icon; and means responsive to said user's clicking on said target icon for completing said process and deactivating said target icon, wherein an appearance of said mouse cursor is initially a key shape and an appearance of said target icon is initially a locked padlock shape to provide the user an indication of the need to direct the mouse cursor to click on the icon.

55. The system of claim 54 wherein said first color of said mouse cursor is blue, and wherein said second color of said mouse cursor is red.

56. In a computer comprising a display, a central processing unit ("CPU"), and one or more input/output ("I/O") devices, a method of inducing a user to initiate a process on a computer, the method comprising means for displaying on a display a mouse cursor;

displaying on said display a target icon;

means responsive to each movement of said mouse cursor for providing auditory clues to said user, said auditory clue comprising an audible word indicating whether the mouse cursor has been moved closer to or further from the target icon;

means responsive to said user's clicking on said target icon for completing said process and means for deactivating said target icon, wherein an appearance of said mouse cursor is initially a key shape and an appearance of said target icon is initially a locked padlock shape to provide the user an indication of the need to direct the mouse cursor to click on the icon.

57. The system of claim 56 wherein said auditory clues indicate whether said user is moving the mouse cursor closer to or farther from said target icon.

* * * * *